United States Patent [19]
Zeller et al.

[11] Patent Number: 5,761,725
[45] Date of Patent: Jun. 2, 1998

[54] CACHE-BASED COMPUTER SYSTEM EMPLOYING A PERIPHERAL BUS INTERFACE UNIT WITH CACHE WRITE-BACK SUPPRESSION AND PROCESSOR-PERIPHERAL COMMUNICATION SUPPRESSION FOR DATA COHERENCY

[75] Inventors: Charles P. Zeller; Darius D. Gaskins, both of Austin, Tex.

[73] Assignee: Dell USA, L.P., Round Rock, Tex.

[21] Appl. No.: 710,053

[22] Filed: Sep. 10, 1996

Related U.S. Application Data

[63] Continuation of Ser. No. 189,215, Jan. 31, 1994, abandoned.
[51] Int. Cl.$^6$ ..................................................... G06F 13/16
[52] U.S. Cl. ........................................... 711/146; 395/309
[58] Field of Search .................................. 395/306, 309, 395/445, 468

[56] References Cited

U.S. PATENT DOCUMENTS

| | | | |
|---|---|---|---|
| 5,269,005 | 12/1993 | Heil et al. | 395/275 |
| 5,283,883 | 2/1994 | Mishler | 395/425 |
| 5,283,904 | 2/1994 | Carson et al. | 395/725 |

OTHER PUBLICATIONS

Hamacher et al., "Computer Organization," 1990, 209–262.

*Primary Examiner*—Tod R. Swann
*Assistant Examiner*—Christopher S. Chow

[57] ABSTRACT

A peripheral bus interface unit is provided that includes a data storage unit for temporarily storing data written from a peripheral unit, and a control unit that executes a write cycle on a system bus to transfer the data into a system memory. The control unit blocks certain communications, such as polling and interrupt communications between a microprocessor and the peripheral device if data temporarily stored within the data storage unit has not yet been transferred to the system memory. In addition, depending upon whether a complete line of data is to be transferred during the write cycle, the control unit either asserts or deasserts a snoop write-back signal. If the snoop write-back signal is asserted, a snoop write-back operation by, for example, a cache controller is allowed. If the snoop write-back signal is deasserted, a snoop write-back operation of the cache controller is suppressed. In one embodiment, a line monitor unit within the peripheral bus interface unit is employed to determine whether a full line of valid words are being transferred during a given cycle. An interrupt latch is also employed to detect an assertion of an interrupt signal generated by the peripheral unit when the peripheral unit has completed its requested transfer. After the control unit causes the corresponding data stored within the data storage unit to be written out to system memory, the asserted interrupt signal is forwarded to a microprocessor via the system bus.

38 Claims, 6 Drawing Sheets

CACHE-BASED COMPUTER SYSTEM EMPLOYING A PERIPHERAL BUS INTERFACE UNIT WITH CACHE WRITE-BACK SUPPRESSION AND PROCESSOR-PERIPHERAL COMMUNICATION SUPPRESSION FOR DATA COHERENCY

This application is a continuation of application Ser. No. 08/189,215, filed Jan. 31, 1994 now abandoned.

COPYRIGHT NOTICE

Incorporated herein is an appendix of specifications, drawings, and a VHSIC Hardware Description Language listing of a cache-based computer system employing an exemplary peripheral bus interface unit with snoop write-back suppression according to the present invention. Copyright, 1993, Dell Computer Corporation. A portion of the disclosure of this patent document contains material which is subject to copyright protection. The copyright owner has no objection to the facsimile reproduction by anyone of the appendix as it appears in the Patent and Trademark Office file or records, but otherwise reserves all copyright rights whatsoever.

BACKGROUND OF THE INVENTION

1. Field of the Invention

This invention relates to cache-based computer systems and, more particularly, to cache-based computer systems that employ a peripheral bus interface unit for coupling data from a bus mastering peripheral device to a system bus.

2. Description of the Relevant Art

Cache memory subsystems are prevalent within modern-day computer systems and are well known. Exemplary cache memory subsystems are described in a host of publications of the known prior art including, for example, U.S. Pat. No. 5,091,875 to Rubinfeld and U.S. Pat. No. 5,091,846 to Sachs, et al.

A cache memory is a high-speed memory unit interposed in the memory hierarchy of a computer system between a slower system memory and a microprocessor to improve effective memory transfer rates and, accordingly, improve system performance. The name refers to the fact that the small cache memory unit is essentially hidden and appears transparent to the user, who is aware only of a larger system memory. The cache is usually implemented by semiconductor memory devices having speeds that are compatible with the speed of the processor, while the system memory utilizes a less costly, lower-speed technology. The cache concept anticipates the likely reuse by the microprocessor of selected data in system memory by storing a copy of the selected data in the cache memory.

A cache memory typically includes a plurality of memory sections, wherein each memory section stores a block or a "line" of two or more words. Each line has associated with it an address tag that uniquely identifies which line of system memory it is a copy of. When a read request originates in the processor for a new word, whether it be data or instruction, an address tag comparison is made to determine whether a copy of the requested word resides in a line of the cache memory. If present, the data is used directly from the cache. This event is referred to as a cache read "hit". If not present, a line containing the requested word is retrieved from system memory and stored in the cache memory. The requested word is simultaneously supplied to the processor. This event is referred to as a cache read "miss".

When the processor desires to write data to memory, a similar address tag comparison is made to determine whether the line into which data is to be written resides in the cache memory. If not present, the line is either fetched into the cache memory from system memory or the data is written directly into the system memory. This event is referred to as a cache write "miss". If the line is present, the data is written directly into the cache memory. This event is referred to as a cache write "hit". As will be explained in greater detail below, in many systems a data "dirty bit" for the cache line is then set. The dirty bit indicates that data stored within the line is dirty (i.e., has been modified and is inconsistent with system memory), and thus, before the line is deleted from the cache memory or overwritten, the modified data must be written back to system memory.

One aspect that affects system performance and design complexity is the handling of writes initiated by the processor or by an alternate bus master. As explained previously, because two copies of a particular piece of data or instruction code can exist, one in system memory and a duplicate copy in the cache, writes to either the system memory or the cache memory can result in an incoherence between the two storage units. For example, consider the case in which the same data is initially stored at a predetermined address in both the cache memory and the system memory. If the processor subsequently initiates a write cycle to store a new data item at the predetermined address, a cache write "hit" occurs and the processor proceeds to write the new data into the cache memory at the predetermined address. Since the data is modified in the cache memory but not in system memory, the cache memory and system memory become incoherent. Similarly, in systems with an alternate bus master, write cycles to system memory by the alternate bus master modify data in system memory but not in the cache memory. Again, the cache memory and system memory become incoherent.

An incoherence between the cache memory and system memory during processor writes can be prevented or handled by implementing one of several commonly employed techniques. In a first technique, a "write-through" cache guarantees consistency between the cache memory and system memory by writing the same data to both the cache memory and system memory. The contents of the cache memory and system memory are always identical, and so the two storage systems are always coherent. In a second technique, a "write-back" cache handles processor writes by writing only to the cache memory and setting a "dirty" bit to indicate cache entries which have been altered by the processor. When "dirty" or altered cache entries are later replaced during a "cache replacement" cycle, the modified data is written back into system memory.

An incoherence between the cache memory and system memory during a write operation by an alternate bus master is handled somewhat differently. For a system that employs write-back caching, one of a variety of bus monitoring or "snooping" techniques may be implemented to determine whether certain lines of data within the cache memory should be invalidated or written-back to system memory when the alternate bus master attempts to write data to system memory. In one such system, when an alternate bus master attempts to write data to system memory, a cache controller determines whether a corresponding line of data is contained within the cache memory. If a corresponding line is not contained by the cache memory, no additional action is taken by the cache controller, and the write cycle initiated by the alternate bus master is allowed to complete. If, on the other hand, a corresponding line of data is contained in the cache memory, the cache controller determines whether that line of data is dirty or clean. If the line is clean, the line is marked invalid by the cache controller and the transfer of data from the alternate bus master into system memory is allowed to complete. The line of data must be marked invalid since the modified (and thus the most up-to-date) data is now contained only within the system memory (following completion of the write cycle by the alternate bus master). If the line of data is instead dirty, a snoop write-back cycle is initiated by the cache controller which causes the alternate bus master to "back-off" and release mastership of the system bus. The cache controller then causes the line of dirty data within the cache memory to be written back into system memory. After the snoop write-back cycle completes, the alternate bus master re-obtains mastership of the system bus, and the write cycle by the alternate bus master is again executed. At this point, the new data is allowed to be written into the system memory. It is noted that the snoop write-back cycle ensures that data coherency is maintained even if writing of data from the alternate bus master does not involve an entire cache line. When snoop write-back cycles are executed, the bandwidth of the computer system is degraded since the alternate bus master must wait for the snoop write-back cycle to complete before performing its data transfer.

Solutions to data coherency become even more difficult and/or can limit system bandwidth even more significantly when a peripheral bus master that resides on a peripheral bus must write data to the system memory through a peripheral bus interface unit. This concept will be best understood with reference to FIG. 1. FIG. 1 illustrates a block diagram of a typical computer system 100 including a microprocessor (CPU) 102 coupled via a local CPU bus 104 to a cache memory 106 and a cache controller 108. Cache controller 108 is coupled to a system bus 112, and a system memory 114 is coupled to the system bus 112 through a memory controller 116. A peripheral unit 118 is coupled to a peripheral bus 119, and a peripheral bus interface unit 120 couples peripheral bus 119 to system bus 112. Peripheral unit 118 is illustrative of any bus mastering device such as a disk drive, a CD ROM unit, a tape drive, or a LAN (local area network) device which is capable of obtaining mastership of peripheral bus 119 and executing a memory write cycle thereupon.

A variety of techniques may be employed to maintain data coherency when peripheral unit 118 desires to write data into system memory 114. One approach involves a memory allocation scheme wherein peripheral bus interface unit 120 fetches a line of data from system memory 114 which corresponds to the data being written from peripheral unit 118. Since peripheral unit 118 may not be writing a complete line of data, the data from peripheral unit 118 is merged into the fetched line from system memory 114. Accordingly, a complete valid line of data results which is temporarily contained by bus interface unit 120. When peripheral unit 118 completes its write cycle on peripheral bus 119 (i.e., when the write data is stored within peripheral bus interface unit 120), it asserts an interrupt signal which is received by microprocessor 102 to indicate that it has completed its requested write cycle. The peripheral bus interface unit 120 subsequently asserts a bus request signal to obtain mastership of the system bus 112 and, upon grant of mastership, executes a burst write cycle to transfer the line of data into system memory 114.

While this approach allows the system bus 112 to service other system requests while peripheral unit 118 is writing data into peripheral bus interface unit 120, the required prefetch of the corresponding line of data within system memory 114 limits the bandwidth of system bus 112. Furthermore, the line of data that is temporarily stored within peripheral bus interface unit 120 after peripheral unit 118 completes its write cycle is dirty. Thus, when peripheral unit 118 asserts the interrupt signal to alert the microprocessor 102 that it has completed its requested write cycle, microprocessor 102 (or another system resource) could request access to data stored within peripheral bus interface unit 120. Accordingly, to maintain data integrity during this situation, peripheral bus interface unit 120 must snoop the system bus 112 to determine whether such a cycle has been initiated. If such a cycle is detected, peripheral bus interface unit 120 must back-off the microprocessor and obtain mastership of the system bus 112 and subsequently write the dirty line of data back to system memory 114. The requirement of this bus snooping capability increases the complexity of peripheral bus interface unit 120.

Another approach that alleviates the data coherency problems associated with a write from peripheral unit 118 requires that peripheral bus interface unit 120 obtain mastership of system bus 112 during the entire time that peripheral unit 118 is executing its write cycle on peripheral bus 119. For this approach, when peripheral unit 118 attains mastership of peripheral bus 119, peripheral bus interface unit responsively obtains mastership of system bus 112. Data written from peripheral unit 118 is buffered through peripheral bus interface unit 120 and, after filling a line of data within a temporary storage buffer within peripheral bus unit 120, a burst write cycle is executed by peripheral bus interface unit 120 to write the line of data into system memory 114. It is noted that for this approach, peripheral bus interface unit 120 holds mastership of system bus 112 for the entire time that peripheral unit 118 is writing data to peripheral bus 119 (unless a snoop write-back cycle is initiated by cache controller 108, during which mastership of the system bus may be temporarily released by peripheral bus interface unit 120 to allow the dirty line of data to be written back from cache memory 106 into system memory 119). Unfortunately, when this approach is employed, the system bus transfer rate 112 is limited by the slower transfer rate of peripheral bus 119. As a result, the bandwidth of the system bus 112 is substantially degraded during writes by the peripheral unit 118.

SUMMARY OF THE INVENTION

The problems outlined above are in large part solved by a cache-based computer system employing an improved peripheral bus interface unit according to the present invention. The peripheral bus interface unit hereof includes a data storage unit coupled between a peripheral bus and a system bus. The data storage unit receives and stores data provided from a peripheral unit connected to the peripheral bus and, when the peripheral bus interface unit attains mastership of the system bus, provides the data to the system bus. As such, the system bus can maintain other system operations while the data storage unit receives data from the peripheral bus.

The peripheral bus interface unit not only includes a data storage unit for maximizing system bus bandwidth, but also employs a control unit for controlling the execution of a write cycle (i.e., such as a burst write cycle) on the system bus to thereby transfer data within the data storage unit into system memory. Depending upon whether a complete line of data is to be transferred during the write cycle, the control unit either asserts or deasserts a snoop write-back signal. If the snoop write-back signal is asserted, a snoop write-back operation is allowed by, for example, a cache controller coupled to the system bus. If the snoop write-back signal is deasserted, a snoop write-back operation of the cache controller is suppressed and inhibited. A line monitor unit within the peripheral bus interface unit is employed to determine whether a full line of valid words is being transferred during a given cycle. If a full line of valid words is being transferred, no snoop write-back cycle will occur even if a cache memory (coupled to the system bus) contains a corresponding dirty line of data. Thus, the bandwidth of the system bus may be increased since, in this situation, a snoop write-back cycle is unnecessary for maintaining data coherency. Conversely, if the data transfer does not encompass a complete line, a snoop write-back cycle is executed by the cache controller in the event that a corresponding dirty line is contained in cache memory. Accordingly, data coherency is maintained.

Certain communications between the microprocessor and the peripheral device are temporarily blocked by the peripheral bus interface unit from the time at which the peripheral unit initiates a write operation to the time at which the data stored within the data storage unit of the peripheral bus interface unit has been transferred into system memory. For example, if the peripheral unit asserts an interrupt signal upon completion of a requested data transfer, the peripheral bus interface unit blocks the interrupt signal such that it is not received by the microprocessor until after the corresponding data within the data storage unit has been unloaded. Similarly, if the microprocessor employs a polling technique to determine whether the peripheral unit has completed a requested transfer, the peripheral bus interface unit blocks any polling requests directed to the peripheral unit until after the corresponding data within the data storage unit has been unloaded. As a result, the microprocessor will not attempt to access the data temporarily stored within the bus interface unit, and thus snooping of the system bus by the peripheral bus interface unit is unnecessary. Simplified circuitry is thereby possible and improved system performance may be attained.

In one embodiment, an interrupt latch is employed within the peripheral bus interface unit to temporarily hold an interrupt signal asserted by the peripheral unit when the peripheral unit has completed a requested data transfer into the peripheral bus interface unit. After the control unit causes the data within the data storage unit to be written out to system memory, the asserted interrupt signal is provided from the interrupt latch to a microprocessor via the system bus. The control unit of the peripheral bus interface unit is further configured to block any I/O read requests of the microprocessor directed to the peripheral unit until after the data temporarily stored within the bus interface unit has been unloaded. Polling requests by the microprocessor are thereby ignored until after the transfer of the data into system memory is complete. Thus, regardless of whether an interrupt technique or a polling technique is employed to determine when the peripheral unit has completed a requested transfer, the microprocessor will not attempt to access the data temporarily stored within the bus interface unit.

Broadly speaking, the present invention contemplates a cache memory coupled to a system bus, and a system memory controller coupled to the system bus and a system memory. The system memory controller is adapted for controlling the storage and retrieval of data within the system memory. A peripheral unit is further provided and coupled to a peripheral bus and adapted for obtaining mastership of the peripheral bus. A peripheral bus interface unit is provided and coupled between the peripheral bus and the system bus, wherein the peripheral bus interface unit includes a data storage unit for temporarily storing data transferred from the peripheral unit to the system bus. A peripheral bus interface unit further includes a control unit capable of asserting a snoop write-back signal if a complete line of data is not being transferred from the data storage unit to the system bus during a write cycle on the system bus. The peripheral bus interface unit is further capable of deasserting the snoop write-back signal if a complete line of data is being transferred from the data storage unit to the system memory during the write cycle.

The present invention further contemplates a computer system comprising a cache controller coupled to a cache memory and a system bus. The cache controller is adapted for controlling the storage and retrieval of data within the cache memory. The cache controller includes a snoop control circuit for controlling the write-back to system memory of dirty data stored within the cache memory if the snoop write-back signal is asserted during the write cycle. The snoop control circuit inhibits the write-back of dirty data to the system memory if the snoop write-back signal is deasserted during the write cycle.

The present invention still further contemplates a peripheral bus interface subsystem. The peripheral bus interface subsystem includes a peripheral bus interface unit coupled between a system bus and a peripheral bus. A peripheral unit is further provided and coupled to the peripheral bus. The peripheral bus interface unit includes a data storage unit for temporarily storing data transferred from the peripheral unit to the system bus. The peripheral bus interface unit includes a control unit capable of asserting a snoop write-back signal if a complete line of data is not being transferred from the data storage unit to the system bus during a write cycle on the system bus. The peripheral bus unit is further capable of deasserting the snoop write-back signal if a complete line of data is being transferred from the data storage unit to the system memory during the write cycle.

The present invention still further contemplates a method for temporarily storing write data from a peripheral device and for suppressing write-back operations from a cache memory of a cache-based computer system. The method comprises the steps of transferring one or more words of data from a peripheral device through a peripheral bus and to a data storage unit coupled between the peripheral bus and a system bus. Once a complete line of valid words is determined, the valid words can then be stored within the data storage unit, and a snoop write-back signal is asserted to allow a cache controller to execute a snoop write-back cycle provided, however, a complete line of valid words is not stored by the data storage unit. The snoop write-back signal can be deasserted to cause the cache controller to suppress the snoop write-back cycle if a complete line of valid words is stored by the data storage unit. Upon executing a write cycle on the system bus, transferral of one or more words to the system memory can thereafter occur.

BRIEF DESCRIPTION OF THE DRAWINGS

Other objects and advantages of the invention will become apparent upon reading the following detailed description and upon reference to the accompanying drawings in which.

Figure 1:
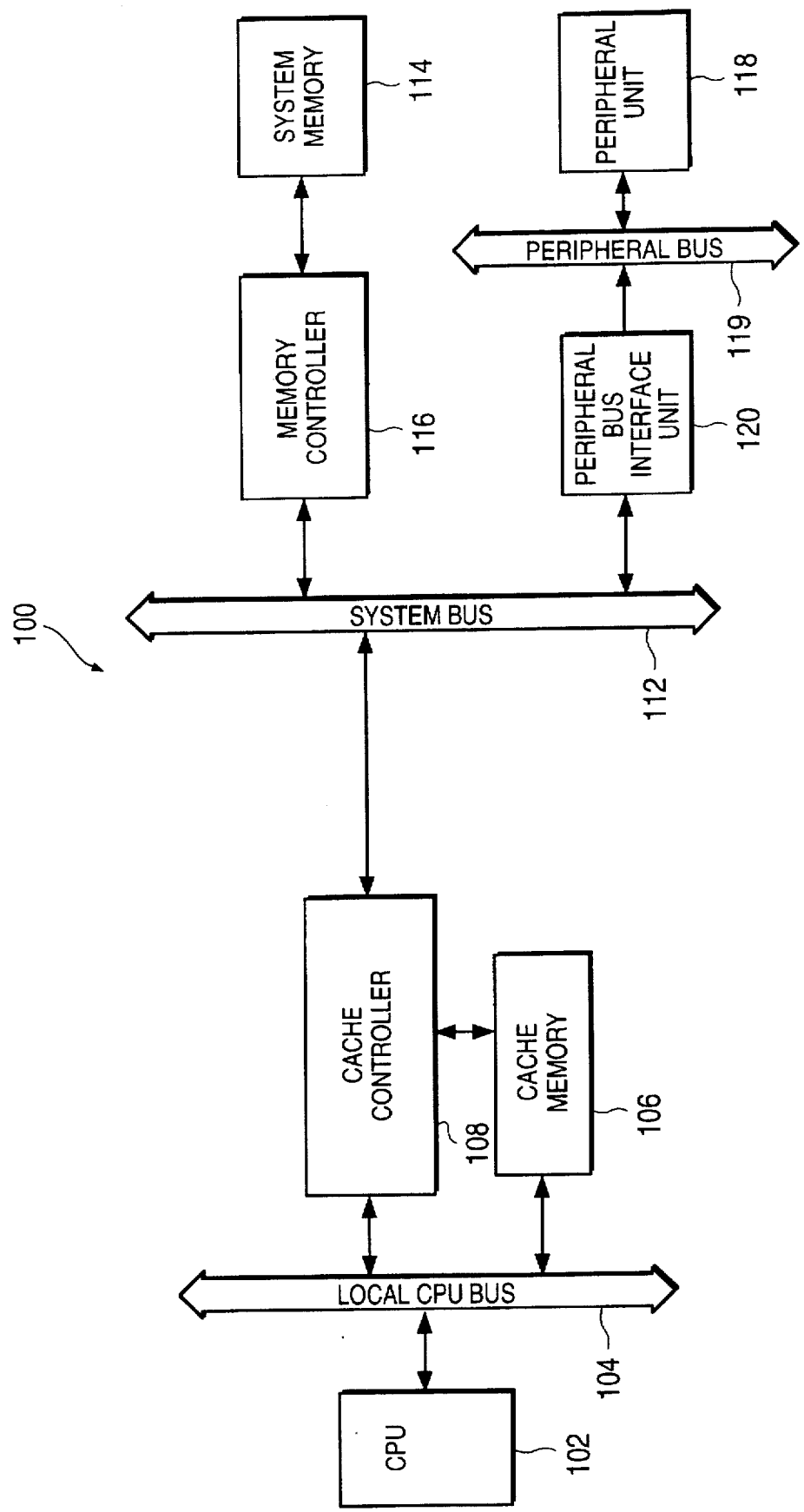
FIG. 1 is a block diagram that illustrates a typical cache-based computer system.

While the invention is susceptible to various modifications and alternative forms, specific embodiments thereof are shown by way of example in the drawings and will herein be described in detail. It should be understood, however, that the drawings and description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 2:
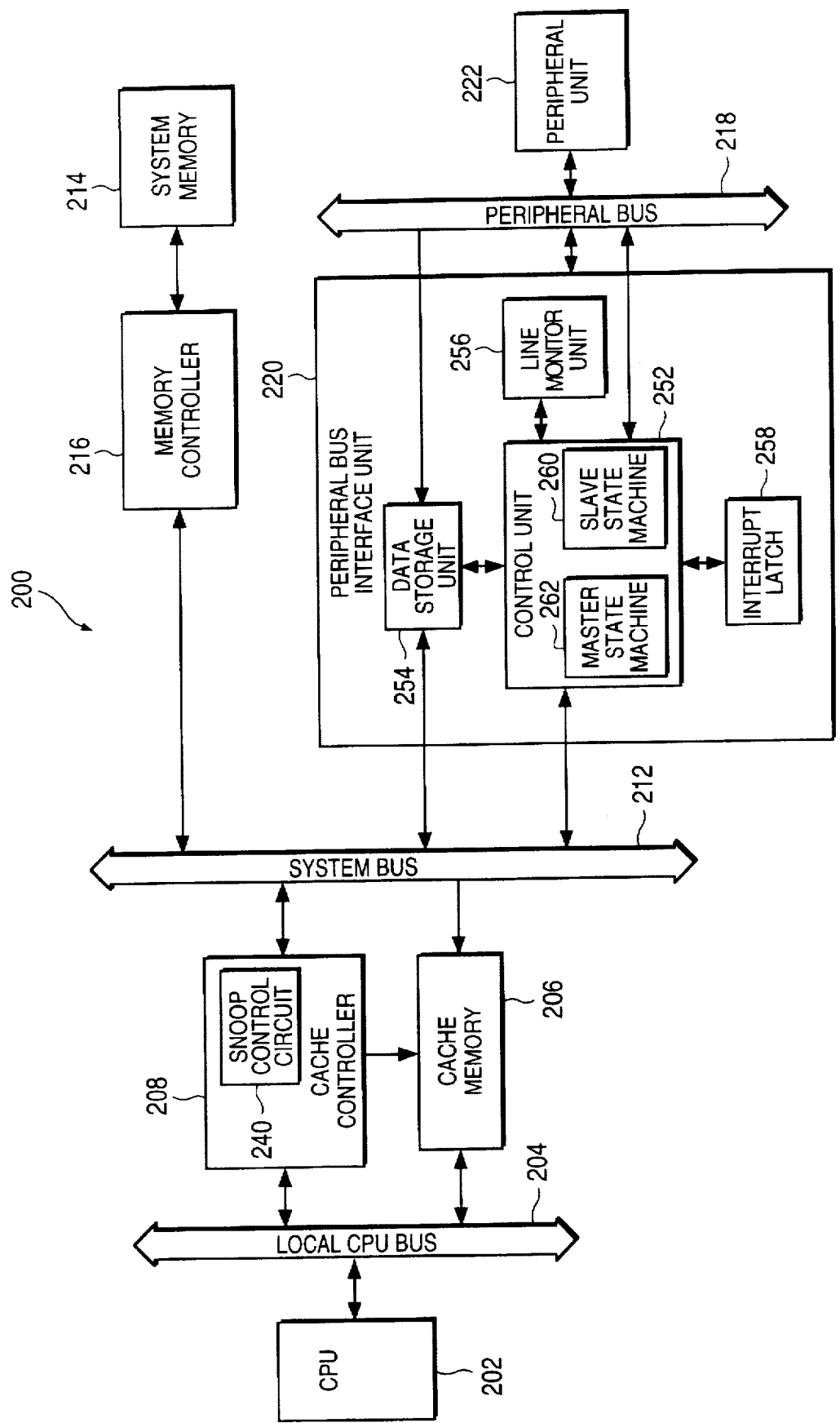
FIG. 2 is a block diagram that illustrates a cache-based computer system employing a peripheral bus interface unit with snoop write-back suppression in accordance with the present invention.

Turning now to FIG. 2, a block diagram is illustrated of a computer system 200 to which the present invention is adapted. The computer system 200 includes a microprocessor (CPU) 202 coupled via a local CPU bus 204 to a cache memory 206 and a cache controller 208. A system bus 212 is coupled to the cache memory 206 and cache controller 208. A system memory 214 is coupled to the system bus 212 through a memory controller 216, and a peripheral bus 218 is coupled to the system bus 212 through a peripheral bus interface unit 220. A peripheral device 222 is finally shown coupled to peripheral bus 218.

In the illustrated form, computer system 200 embodies a single processor, single-cache architecture. It is understood, however, that the present invention may be adapted to multi-processor and/or multi-cache systems. It is further understood that a variety of other devices may be coupled to system bus 212, such as a bus arbiter, the structure and function of which is well known.

Peripheral bus 218 may be any suitable bus for connection to peripheral devices such as disk drives, tape units, (LAN) local area network devices, and/or CD-ROM units. Exemplary peripheral bus standards include the ISA (Industry Standard Architecture) bus, the EISA (Extended Industry Standard Architecture) bus, the SCSI (Small Computer System Interface) bus and the PCI bus.

Microprocessor 202 is a data processing unit that implements a predetermined instruction set. Exemplary processing units include the model 80486 microprocessor as well as the Intel Pentium microprocessor. For situations in which the microprocessor includes an on-chip cache, such as in the model 80486 and Pentium microprocessors, cache memory 206 forms a secondary cache memory.

Cache controller 208 orchestrates the transfer of control and address signals between microprocessor 202 and system bus 212, and further manages the transfer of data between microprocessor 202, cache memory 206 and system bus 212. In the preferred form, microprocessor 202, cache memory 206 and cache controller 208 may operate concurrently to provide maximum sustained performance in the computer system 200.

System bus 212 has a predetermined bit width and is the computer system's primary bus. System bus 212 supports a write-back caching protocol and supports burst-mode data transfers. System memory 214 is a physical memory of a predetermined size and is implemented with DRAM (dynamic random access memory). Memory controller 216 controls and orchestrates the transfer of data, address and control signals between system bus 212 and system memory 214.

Cache memory 206 includes a plurality of memory sections, wherein each memory section is capable of storing a line of data. In this embodiment, a line of data includes four words, although it is understood that depending upon the system, each line could be alternatively defined to contain a greater or lesser number of words. Associated with each line within cache memory 206 are address tag information and state information (i.e., valid/invalid and dirty data information). The address tag indicates a physical address of system memory 214 that corresponds to each entry within cache memory 206. The state information is comprised of a valid bit and a dirty bit. The valid bit indicates whether a predetermined cache line contains valid cache data, while the dirty bit identifies whether the particular cache line is dirty. In an invalid state, there is no data in the corresponding cache memory entry. In a valid (or "clean") state, the cache memory entry contains data which is consistent with system memory 214. In a dirty state, the cache memory entry contains valid data which is inconsistent with system memory 214. Typically, the dirty state results when a cache memory entry is altered by a write operation.

Cache controller 208 includes conventional circuitry that controls well-known caching functions such as read, write, update, invalidate and flush operations. Cache controller 208 further includes a snoop control circuit 240 that monitors read and write cycles executed by alternate bus masters of system in bus 212. If a write cycle is initiated by an alternate bus master of system bus 212 to write data into a memory location of system memory 214, the snoop control circuit 240 determines whether a corresponding line of data is contained by cache memory 206 and, if present, determines whether that line is dirty or clean. If the line within cache memory 206 is clean, the snoop control circuit 240 invalidates the line. If, on the other hand, the line of cache memory 206 is dirty, the snoop control circuit 240 selectively causes the dirty line to be written back into system memory 214 depending upon a snoop write-back signal. For example, as will be explained in greater detail below, if the data written from peripheral unit 222 meets certain conditions, the snoop write-back signal is asserted by peripheral bus interface unit 220 which allows a corresponding dirty line within cache memory 206 to be written-back to system memory 214 during a snoop write-back cycle. If the snoop write-back signal is not asserted, the snoop write-back operation is suppressed such that a corresponding dirty line within cache memory 206 will not be written-back to system memory 214. As will also be explained in greater detail below, the snoop write-back signal is asserted if the write transfer from peripheral bus interface unit 220 does not encompass an entire cache line, and the snoop write-back signal is deasserted if the write transfer from peripheral bus interface unit 220 does encompass a complete cache line. An exemplary cache controller 208 including a snoop control circuit 240 that is responsive to the snoop write-back signal is disclosed within the, commonly assigned U.S. Pat. No. 5,623,633 entitled "Cache-Based Computer System Employing A Snoop Control Circuit with Write-Back Suppression" by Zeller, et al., filed (herein incorporated by reference in its entirety).

Peripheral bus interface unit 220 includes a control unit 252 coupled to a data storage unit 254, a line monitor unit 256, and an interrupt latch 258. A slave state machine 260 and a master state machine 262 are embodied within control unit 252.

Data storage unit 254 is capable of receiving one or more lines of data from peripheral unit 222 via peripheral bus 218. In a preferred embodiment, data storage unit 254 is capable of storing a total of two lines of data from peripheral unit 222, although it is understood that data storage unit 254 could be designed to store any number of lines of data.

Line monitor unit 256 counts the number of valid words in each line of data storage unit 254 as the words are transferred from peripheral unit 222. Depending upon the number of valid words counted by line monitor unit 256, control unit 252 either asserts or deasserts the snoop write-back signal when the data is subsequently written to system memory 214 by the peripheral bus interface unit 220.

Slave state machine 260 is responsive to write cycles initiated by peripheral unit 222, and coordinates the storage of data within data storage unit 254. Slave state machine 260 further provides an indication to the master state machine 262 regarding the status of each line (i.e., full or partially full) as determined by line monitor unit 256. After a line of data has been filled within data storage unit 254 (or when peripheral unit 222 completes its transfer cycle), master state machine 262 obtains mastership of system bus 212 and executes a burst write cycle on system bus 212 to write the data stored within a line of the data storage unit 254 into system memory 214. Master state machine 262 deasserts the snoop write-back signal if a complete line of data is being transferred during the burst write cycle and asserts the snoop write-back signal if a complete line of data is not being transferred during the burst write cycle. It is noted that control unit 252 further contains circuitry for interfacing addressing signals between peripheral bus 218 and system bus 212.

As will be explained in greater detail below, peripheral bus interface unit 220 blocks certain communications between the microprocessor 202 and the peripheral unit 222 from the time at which the peripheral unit 222 initiates a write operation to the time at which the data temporarily stored within the data storage unit 254 has been transferred into system memory 214. For situations in which microprocessor 202 employs a polling technique to determine whether peripheral unit 222 has completed a requested data transfer, the control unit 252 blocks any I/O read requests by the microprocessor 202 that are directed to peripheral unit 222 from the time at which peripheral unit 222 initiates the write operation to the time at which the data stored within data storage unit 254 has been transferred into system memory 214. Any polling requests by the microprocessor 202 to the peripheral unit 222 are thereby ignored until after the data transfer into system memory 214 is complete. Similarly, for situations in which peripheral unit 222 asserts an interrupt signal to the microprocessor 202 to indicate that it has completed a requested data transfer, interrupt latch 258 is set in response to an assertion of the interrupt signal. Control unit 252 prevents this asserted interrupt signal from being forwarded to system bus 212 (and thus to microprocessor 202) until after the corresponding data stored within data storage unit 254 has been transferred into system memory 214. As a result, microprocessor 202 will not execute a cycle to retrieve the data stored within data storage unit 254. Therefore, it is not necessary for peripheral bus interface unit 220 to snoop system bus 212 even though peripheral unit 222 has indicated completion of its cycle and the data within data storage unit 254 has not yet been transferred to system memory 214. Further details regarding peripheral bus interface unit 220 will be provided below.

Figure 3:
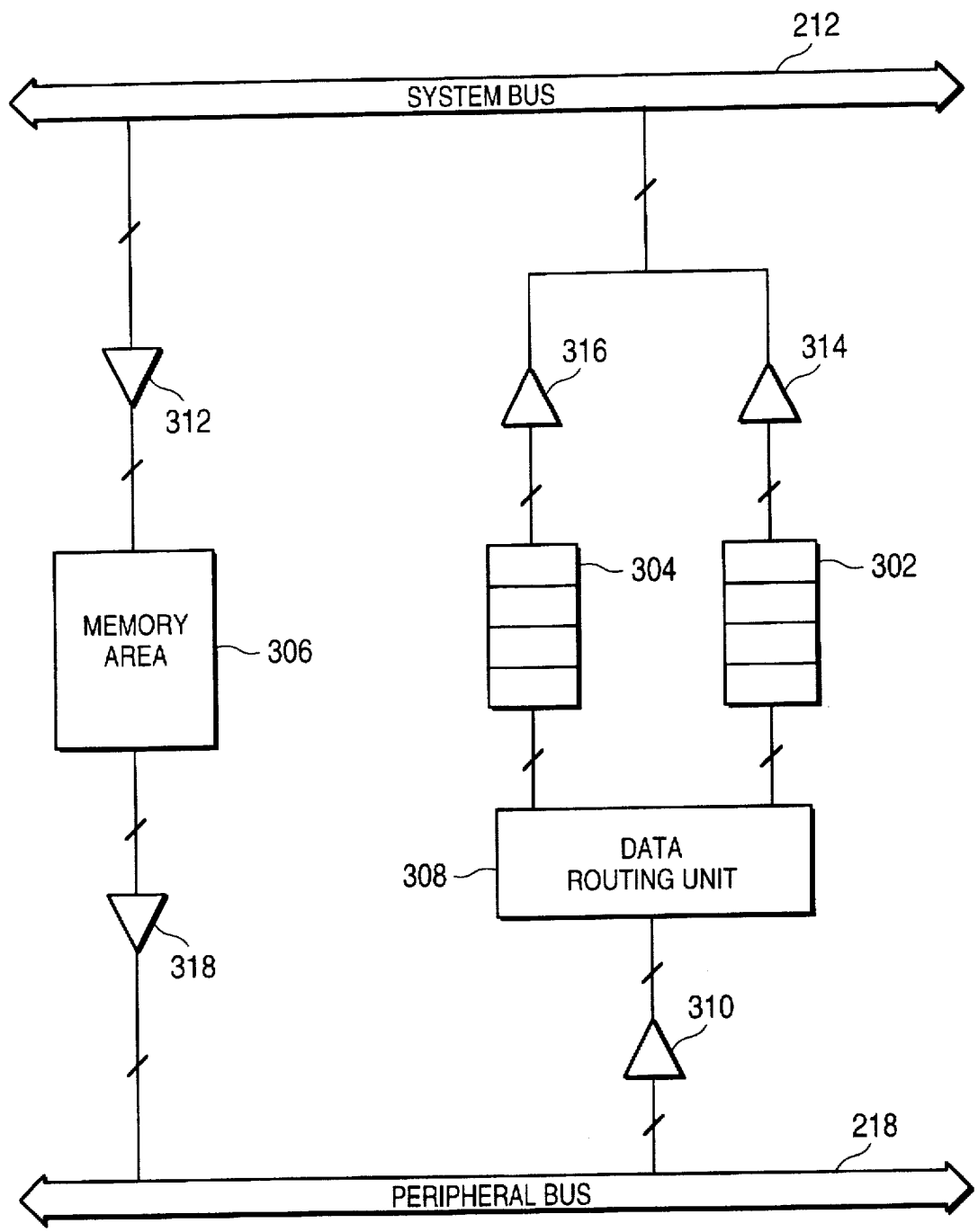
FIG. 3 is a block diagram of a data storage unit within a peripheral bus interface unit.

FIG. 3 is a block diagram that depicts one implementation of data storage unit 254. Data storage unit 254 includes memory areas 302, 304, and 306, and a data routing unit 308. The data storage unit 254 further includes input buffers 310 and 312, and output buffers 314, 316, and 318.

Each memory area 302 and 304 is capable of storing four words of data (i.e., a complete line) from peripheral bus 218 in a first-in, first out manner. Data routing unit 308, which is controlled by the control unit 252 (of FIG. 2), routes the data to memory regions 302 and 304 such that when one of the memory regions is full, additional incoming data is routed to the other memory region until it is full. Thus, while one memory region 302 or 304 is receiving data from peripheral bus 218, the other memory region is available to provide data to system bus 212, as will be better understood below. It is noted that memory region 306 and buffers 312 and 318 are provided to accommodate data transfers from system bus 212 to peripheral bus 218.

Figure 4A:
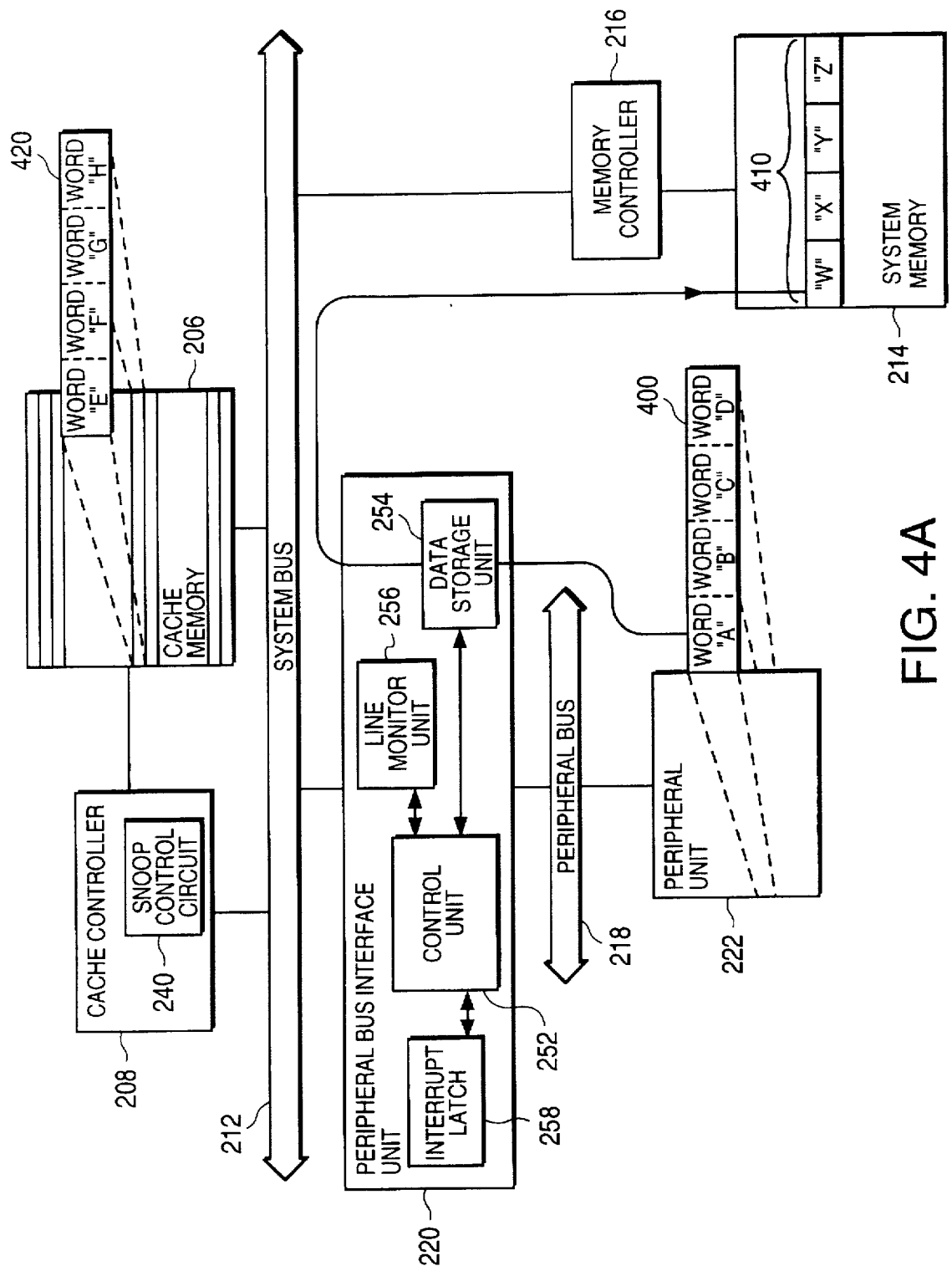
FIGS. 4A–4B are block diagrams that illustrate the flow of data within the computer system of FIG. 2.

Referring next to FIG. 4A, a write operation is depicted for a situation wherein the peripheral unit 222 desires to write a line of data 400 into a memory region 410 of system memory 214. In this example, line 400 consists of four words "A", "B", "C" and "D", and memory region 410 consists of four address locations "W", "X", "Y" and "Z". When the write operation is initiated by peripheral unit 222, the words "A", "B", "C", and "D" are sequentially stored within data storage unit 254. It is noted that the transfer by peripheral unit 222 of words "A", "B", "C", and "D" may be accomplished through the execution of a burst cycle or through execution of separate single-word write cycles. The storage of the line of data 400 into data storage unit 254 is controlled by the slave state machine 260 (depicted in FIG. 2) of control unit 252.

As each word of data within line 400 is stored within data storage unit 254, line monitor unit 256 increments to determine the total number of words being transferred by peripheral unit 222. After line monitor unit 256 detects that a complete line of words has been transferred into data storage unit 254 (in this embodiment, each line consists of four words), line monitor unit 256 indicates to the control unit 252 that mastership of system bus 212 should be requested. When mastership of system bus 212 is granted, peripheral control unit 252 executes a burst write cycle on system bus 212 which causes the line of data 400 to be stored within memory region 410 of system memory 214. Since the data transferred during the burst write cycle encompasses an entire line of valid words, the peripheral control circuit deasserts the snoop write-back signal which is received by snoop control circuit 240. The deassertion of the snoop write-back signal prevents the cache controller 208 from executing a snoop write-back cycle even if a corresponding line of data 420 within cache memory 206 contains dirty data. The snoop control circuit 240 instead invalidates the line 420 of cache memory 206.

Although the transfer of the line 400 into system memory 214 is accomplished by executing a burst write cycle in which up to four words may be transferred per cycle, peripheral unit 222 may only write, for example, the words "A", "B", and "C" and may not write the fourth word "D" into data storage unit 254. In this situation, when peripheral unit 222 completes its write operation, peripheral bus interface unit 220 obtains mastership of system bus 212, and control unit 252 executes a burst write cycle to transfer the words "A", "B", and "C" into system memory 214. Depending upon the particular burst transfer scheme employed by the system, peripheral bus interface unit 220 either marks the fourth word of the burst cycle invalid or does not transfer a fourth word for that burst cycle. If a corresponding dirty line of data is not contained by cache memory 206, a snoop write-back cycle is not executed when the data is received by the memory controller 216, and words "A", "B", and "C" are written into address locations "W", "X" and "Y", respectively. In this situation, memory controller 216 prevents the data stored at address location "Z" of memory region 410 from being overwritten. The integrity of data within the system is thereby maintained.

Figure 4B:
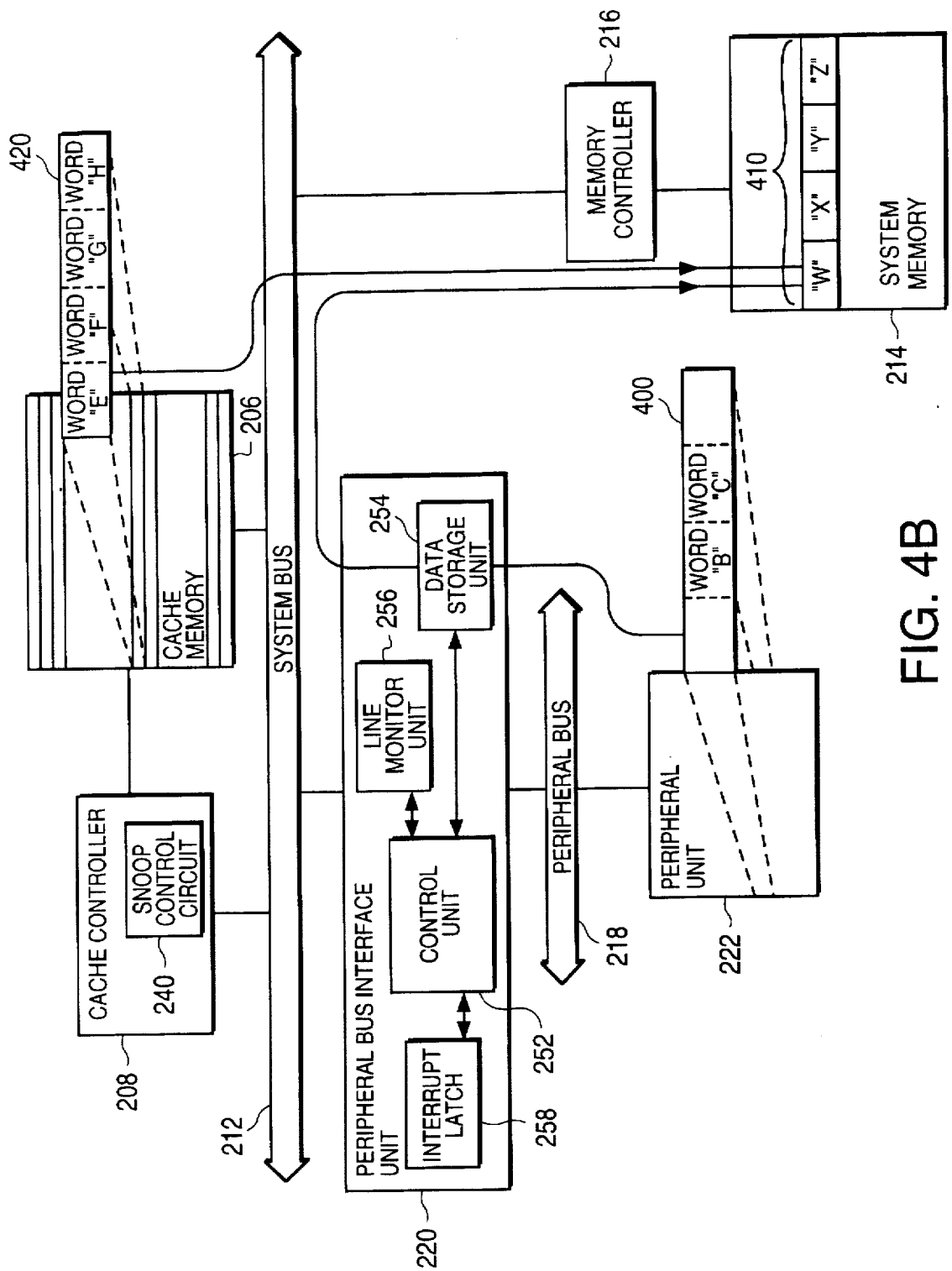

FIG. 4B illustrates the flow of data when peripheral unit 222 writes data to system memory 214 which does not encompass a complete cache line and when a corresponding dirty line of data is contained within cache memory 206. As depicted in FIG. 4B, when peripheral unit 222 desires to write, for example, the words "B" and "C" into system memory 214, the words are first stored within data storage unit 254 when peripheral unit 222 executes a write cycle on peripheral bus 218. Upon completion of the write cycle by peripheral unit 222, peripheral unit 222 deasserts mastership of peripheral bus 218 and asserts an interrupt signal to indicate that it has completed its desired write operation. The asserted interrupt signal is thus detected by interrupt latch 258; however, the asserted interrupt signal is not passed on to system bus 212 until a later time, as described below. At this point, line monitor unit 256 determines that data storage unit 254 contains an incomplete line of data, and control unit 252 requests mastership of system bus 212. When mastership of system bus 212 has been granted, a burst write cycle is initiated by control unit 252 to write the words "B" and "C" to locations "X" and "Y" of system memory 214. Since an incomplete line of data is being transferred by peripheral bus interface unit 220, the snoop write-back signal is simultaneously asserted by control unit 252. In response, if cache memory 206 contains a corresponding line of data 420 which has been marked dirty, then snoop control circuit 240 initiates a snoop write-back cycle which causes the line of data 420 to be written back into system memory 214. Following the snoop write-back cycle, the words "B" and "C" are written into locations "X" and "Y" of memory region 410 of system memory 214. Accordingly, the resulting line within memory region 410 of system memory 214 contains words "E", "B", "C", and "H".

For the data transfers depicted within both FIGS. 4A and 4B, the microprocessor 202 may either poll the peripheral unit 222 to determine whether it has completed its requested data transfer, or peripheral unit 222 may assert an interrupt signal to indicate that it has completed the requested data transfer. It is noted that either of these events may occur before the data temporarily stored within data storage unit 254 has actually been transferred into system memory 214. Therefore, to protect against these events, once the peripheral unit 222 has initiated a cycle to transfer data into system memory 214, communications between the microprocessor 202 and the peripheral unit 222 are prevented by peripheral bus interface unit 220 until after the corresponding data temporarily stored by data storage unit 254 has been transferred into system memory 214. If microprocessor 202 executes an I/O read request to poll the peripheral unit 222, such a request is blocked by the control unit 252 if data storage unit 254 contains data that has not yet been transferred into system memory 214. The microprocessor 202 will therefore infer that the peripheral unit 222 has not yet completed the requested transfer. Similarly, if peripheral unit 222 asserts an interrupt signal to indicate that it has completed its requested write cycle, the asserted interrupt signal will cause interrupt latch 258 to be set. However, a corresponding interrupt signal is not provided to microprocessor 202 by control unit 252 until after the data within data storage unit 254 has been transferred into system memory 214. Once the data within data storage unit 254 has been transferred into system memory 214, control unit 252 allows the microprocessor 202 to poll the peripheral unit 222, or provides an asserted interrupt signal to microprocessor via system bus 212 if interrupt latch 258 was set. At this point, the microprocessor 202 may access the data written into system memory 214 from peripheral unit 222. Since communications between microprocessor 202 and peripheral unit 222 are essentially blocked until after the data is transferred from data storage unit 254 into system memory 214, peripheral bus interface unit 220 is not required to snoop the system bus 212 to prevent data incoherency in the event that microprocessor 202 attempts to access the data before it is actually transferred into system memory 214.

Figure 5:
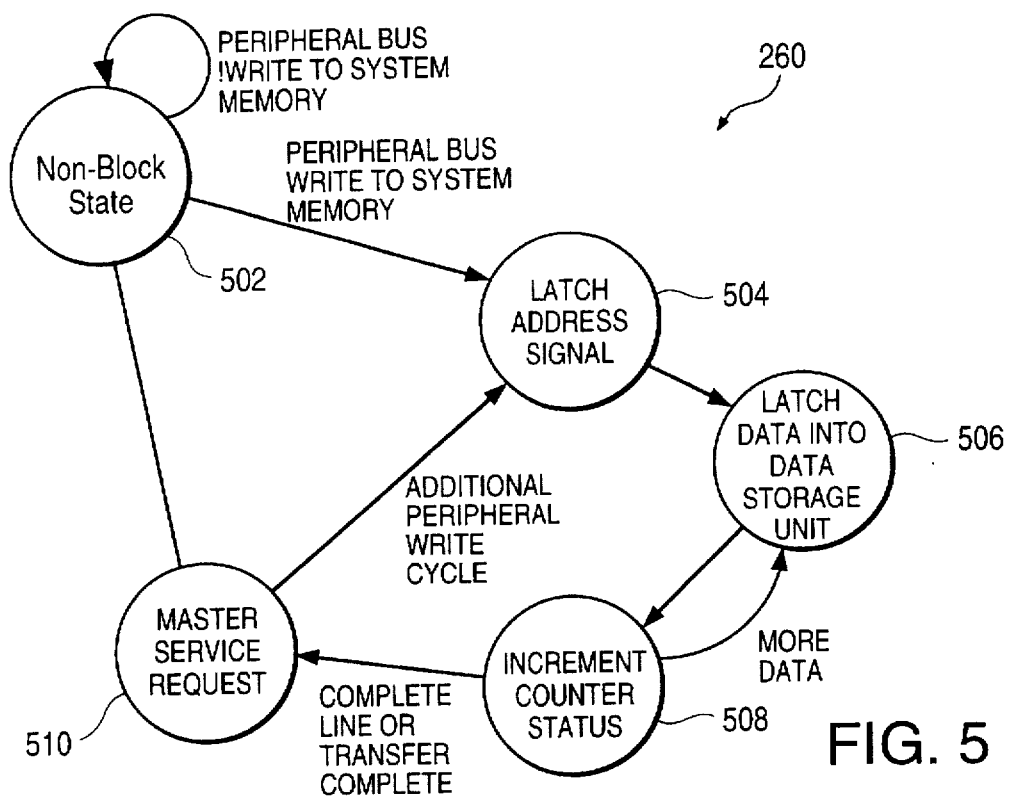
FIG. 5 and 6 are diagrams of algorithmic state machines incorporated within a peripheral bus interface unit of the computer system of FIG. 2.

FIG. 5 is an algorithmic state diagram of slave state machine 260 incorporated as an integral part of peripheral bus interface unit 220. The algorithmic state machine 260 controls the storage of data from peripheral bus 218 into data storage unit 254 and determines whether the data transfer from peripheral unit 222 encompassed a complete line. Slave state machine 260 further prevents communications between the microprocessor 202 and the peripheral unit 222 during certain times and detects the assertion of an interrupt signal that may be generated by peripheral unit 222.

Referring collectively to FIGS. 2 and 5, the slave state machine 260 enters and remains in a non-block state 502 upon reset until peripheral unit 222 executes a memory write cycle on peripheral bus 218. During non-block state 502, slave state machine 260 allows polling requests in the form of I/O read requests from microprocessor 202 to pass to peripheral unit 222 and allows interrupts to pass from peripheral unit 222 to microprocessor 202, provided that the master state machine 262 is also in a non-block state, as will be explained further below. Upon the occurrence of a write cycle initiated by peripheral unit 222 to write data into system memory 214, state machine 260 makes a transition to state 504 during which the address of the data being written is latched into control unit 252. Subsequently, during state 506, the first word of data is latched into data storage unit 254, and state machine 260 enters a state 508 during which a value of line monitor unit 256 is incremented to indicate that one valid word has been stored within a line of the data storage unit 254. Subsequently, the state machine 260 reverts back to state 506 if another word of data must be stored within data storage unit 254. It is noted that, depending upon the system, an additional address signal corresponding to such an additional word may also be stored within peripheral bus interface unit 220. The value of line monitor unit 256 is again incremented during state 508, and the process is repeated until a complete line of data has been stored within data storage unit 252 or until the transfer from peripheral unit 222 has completed. State 510 is next entered during which state machine 260 initiates a master service request. This activates the master state machine 262, as will be explained below. State machine 260 may then reenter state 504 if further data is being transferred by peripheral unit 222, or may re-enter state 502 if further data is not being received. It is noted that when slave state machine 260 is in a state other than non-block state 502, communications between microprocessor 202 and peripheral unit 222 are blocked.

Figure 6:
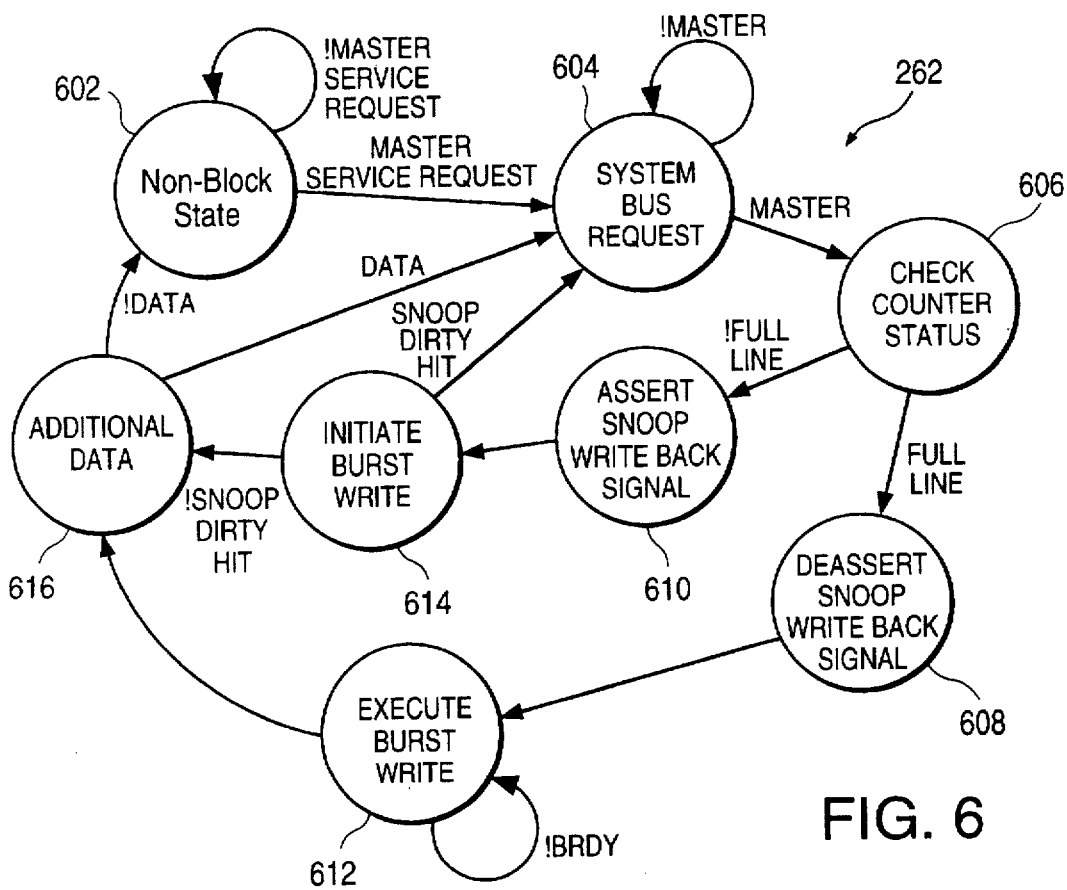

FIG. 6 is an algorithmic state diagram of the master state machine 262 within control unit 252. The master state machine 262 controls the execution of burst write cycles on system bus 212 to write data temporarily stored within data storage unit 254 into system memory 214. Master state machine 262 additionally asserts or deasserts the snoop write-back signal depending upon the status of each line being transferred (as determined by line monitor unit 256).

Referring collectively to FIGS. 2 and 6, state machine 262 remains in a non-block state 602 until a master service request is initiated by the slave state machine 260. During non-block state 602, polling requests by microprocessor 202 are allowed to pass to peripheral unit 222 and interrupts generated by peripheral unit 222 are allowed to pass to microprocessor 202 if slave state machine 260 is also in a non-block state (i.e., state 502). It is noted that when state machine 262 exits a non-block state 602, such communications are blocked. When a master service request is initiated, state machine 262 makes a transition to bus request state 604 during which mastership of system bus 212 is requested. When mastership of the system bus 212 has been granted, state 606 is entered during which the status of the line to be transferred is determined by checking the status of line monitor unit 256. Depending upon whether line monitor unit 256 indicates that the data to be transferred encompasses a full line or not, the snoop write-back signal is either deasserted or asserted during states 608 and 610, respectively. If the snoop write-back signal is deasserted, a burst write cycle is executed during state 612, and state 616 is subsequently entered. Conversely, if the snoop write-back signal is asserted, a burst write cycle is initiated during state 614. At this point, cache controller 208 may initiate a snoop write-back cycle if a corresponding line of dirty data is contained within cache memory 206. If a snoop write-back cycle is executed, state machine 262 reverts back to state 604 and loops back to state 614 during which time the burst write cycle is re-attempted. When the burst write cycle completes, state 616 is entered.

During state 616, if data remains within data storage unit 254 and the slave state machine 260 has initiated another master service request, state machine 262 reenters state 604 to transfer the additional data. On the other hand, if the data storage unit 254 is empty and the slave state machine 260 has not received additional data, the master state machine 262 reverts back to non-block state. At this point, if an interrupt signal is or was asserted by peripheral unit 222 that caused interrupt latch 258 to be set, the master state machine 262 asserts a corresponding interrupt signal on system bus 212 to indicate that the requested transfer by peripheral unit 222 has completed. The interrupt latch 258 is then reset by master state machine 262. It is noted that once the master state machine 262 reverts back to non-block state 602, subsequent polling by the microprocessor 202 is again allowed to pass through the peripheral bus interface unit 220 and to the peripheral unit 222. The microprocessor 202 can thereby determine that the peripheral unit 222 has completed its requested data transfer (for situations in which peripheral unit 222 does not assert an interrupt).

The algorithmic state machines 260 and 262 may be reduced to sequential logic circuits by employing a variety of well known techniques. For example, computer-aided design tools may be employed to reduce the state machines 260 and 262 to sequential logic circuitry. Exemplary computer-aided design tools include the behavioral language Verilog as well as the VHSIC hardware description language. An appendix is incorporated herein. The appendix discloses a VHSIC Hardware Description Language listing of a computer system according to the present invention.

It is noted that the present invention may be implemented in conjunction with a variety of other bus transfer techniques and alternative system configurations. For example, the present invention may be implemented in conjunction with systems employing either non-pipelining or pipelining techniques. Similarly, the present invention may be implemented within multi-processor and/or multi-cache systems.

Numerous variations and modifications will become apparent to those skilled in the art once the above disclosure is fully appreciated. For example, the number of words that comprise a predefined line within the cache memory may vary without departing from the spirit and scope of the present invention. In addition, although the embodiment of FIG. 2 includes a counter for determining whether the data transferred from data storage unit 254 encompasses a complete valid line, other line monitor units could be employed. It is intended that the following claims be interpreted to embrace all such variations and modifications.

What is claimed is:

1. A computer system comprising:

a system bus;

a cache memory coupled to said system bus;

a processor coupled to said cache memory;

a system memory;

a system memory controller coupled to said system bus and to said system memory for controlling storage and retrieval of data within system memory;

a peripheral bus;

a peripheral unit coupled to said peripheral bus;

a peripheral bus interface unit coupled between said peripheral bus and said system bus;

wherein said peripheral bus interface unit includes a data storage unit for temporarily storing data transferred from said peripheral unit to said system bus; and a control unit, coupled to said peripheral bus interface unit, for blocking communication associated with peripheral unit data transfer status between said processor and said peripheral unit during a data transfer period beginning with a peripheral unit data transfer to said data storage unit and continuing until data transferred from said peripheral unit to said data storage unit is transferred into said system memory;

wherein said control unit blocks said communication without obtaining mastership of said system bus during at least a portion of said data transfer period.

2. The computer system as recited in claims 1 wherein said control unit is capable of allowing communication to occur between said processor and said peripheral unit after said data within said data storage unit is transferred into said system memory.

3. The computer system as recited in claim 1 wherein said communication between said processor and said peripheral unit includes a polling request by said processor directed to said peripheral unit.

4. The computer system as recited in claim 1 wherein said communication between said processor and said peripheral unit includes a transmission of an interrupt signal from said peripheral unit to said processor.

5. The computer system as recited in claim 4 wherein said communication between said processor and said peripheral unit includes a transmission of a polling request by said processor directed to said peripheral unit.

6. The computer system as recited in claim 4 wherein said peripheral bus interface unit further includes an interrupt interface circuit, wherein said interrupt interface circuit is capable of detecting an assertion of said interrupt signal generated by said peripheral unit, and wherein said control unit is capable of asserting a corresponding interrupt signal to said processor after said data within said data storage unit is transferred into said system memory.

7. The computer system as recited in claim 6 wherein said interrupt interface circuit is a latch circuit.

8. The computer system as recited in claim 1 wherein said cache memory includes a line of data, said control unit includes a data line detector coupled to said data storage unit, and, during operation, said control unit asserts a snoop write-back signal to said cache memory to allow said cache memory to write-back said line of data to said system memory if said cache memory line of data is dirty, said cache memory line of data corresponds to a line of data in said data storage unit, and if said control unit data line detector detects an absence of a valid and complete line of data in said data storage unit.

9. The computer system as recited in claim 1 wherein said data storage unit comprises:

first and second memory areas, each capable of storing four words of data transferred from said peripheral unit;

first and second output buffers coupled between said system bus and respective output terminals of said first and second memory areas;

a data routing unit, coupled to respective input terminals of said first and second memory areas, for routing data to said first and second memory areas, and controlled by said control unit to allow one of said memory areas to receive data while said other memory area transfers data; and an input buffer coupled between an input terminal of said data routing unit and said peripheral bus.

10. The computer system as recited in claim 1 wherein said control unit blocks said communication without obtaining mastership of said system bus during said transfer of data from said peripheral unit to said data storage unit.

11. A peripheral bus interface subsystem coupled to a system memory comprising:

a peripheral bus interface unit coupled between a system bus and a peripheral bus; and a peripheral unit coupled to said peripheral bus;

wherein said peripheral bus interface unit includes a data storage unit for temporarily storing data transferred from said peripheral unit, and wherein said peripheral bus interface unit includes a control unit capable of blocking communication associated with a data transfer status of said peripheral unit during a data transfer period beginning with a peripheral unit data transfer to said data storage unit and continuing until data transferred from said peripheral unit to said data storage unit is transferred into said system memory;

wherein said control unit is capable of blocking said communication without obtaining mastership of said system bus during at least a portion of said data transfer period.

12. The peripheral bus interface subsystem as recited in claim 11 further comprising:

a system memory coupled to said system bus;

wherein said control unit is capable of allowing said communication to occur after said data within said data storage unit is transferred into said system memory.

13. The peripheral bus interface subsystem as recited in claim 11 further comprising:

a system memory coupled to said system bus;

a processor coupled to the peripheral bus interface unit;

wherein said communication includes a transmission of an interrupt signal from said peripheral unit to said processor wherein said peripheral bus interface unit further includes an interrupt interface circuit, wherein said interrupt interface circuit is capable of detecting an assertion of an interrupt signal generated by said peripheral unit, and wherein said control unit is capable of asserting a corresponding interrupt signal to said processor after said data within said data storage unit is transferred to said system memory.

14. The peripheral bus interface subsystem as recited in claim 11 wherein said peripheral bus interface unit further includes a line monitor unit coupled to said control unit, wherein said line monitor unit is capable of determining whether a complete line of valid data is contained by said data storage unit.

15. The peripheral bus interface subsystem computer system as recited in claim 14 wherein said line monitor unit includes a counter for counting a number of words transferred from said peripheral unit into said data storage unit.

16. The peripheral bus interface subsystem as recited in claim 11 further comprising:

a processor coupled to said peripheral bus interface;

wherein said communication includes a transmission of a polling request by said processor.

17. The peripheral bus interface subsystem of claim 11 wherein said control unit is capable of blocking said communication without obtaining mastership of said system bus during data transfer from said peripheral unit to said data storage unit.

18. A method for maintaining data coherency within a computer system, said computer system having a peripheral bus interface unit coupled between a peripheral bus and a system bus and having a system memory coupled to said system bus, the method comprising the steps of:

a) transferring one or more words of data from a peripheral device, through said peripheral bus, to a data storage unit coupled to said peripheral bus interface unit;

b) transferring one or more words of data from said data storage unit, through said system bus, to said system memory; and c) blocking communication associated with a data transfer status of said peripheral device between a processor of said computer system and said peripheral device during said step of transferring data from said peripheral device and until completion of said step of transferring data to said system memory without obtaining mastership of said system bus during at least a portion of a data transfer period which begins with the transferring of one or more words of data in step a) and ends with a beginning of the transferring of one or more words of data in step b).

19. The method as recited in claim 18 comprising the further steps of:

detecting an assertion of an interrupt signal by said peripheral device to said processor following completion of data transfer;

blocking said interrupt signal assertion from said processor;

transferring said data transferred to said data storage unit to a system memory; and following said data transferring step to said system memory, providing an interrupt signal to said processor corresponding to said blocked interrupt signal.

20. The method as recited in claim 18 wherein said communication is a polling request from said processor to said peripheral device, the method comprising the further steps of:

detecting said polling request with said peripheral bus interface unit.

17

21. The method as recited in claim 18 comprising the further step of:

transferring one or more words of data from said data storage unit to said system bus either when said data storage unit contains a valid line, or when said step of transferring data from said peripheral device to said data storage unit is complete.

22. The method as recited in claim 18 further comprising the steps of:

determining whether a line of data stored within said data storage unit is incomplete;

determining whether a line of data in a cache memory is dirty and corresponds to said line of data in said data storage unit;

writing said data storage unit line of data to system memory;

asserting a cache write-back signal to allow said cache memory to write said cache memory line of data to system memory if said data storage unit line of data is incomplete, said cache memory line of data is dirty and corresponds to said data storage unit line of data; and preventing said cache memory from writing said cache memory line of data to system memory if said data storage unit line of data is complete.

23. The method as recited in claim 18 further comprising the steps of:

writing said temporarily stored data from said data storage unit to said system memory; and unblocking said communication between said processor and said peripheral device.

24. A computer system comprising:

a system bus;

a processor;

a cache assembly, coupled to said processor and system bus, for storing data and for executing cache write-back cycles;

a peripheral device;

a peripheral interface unit coupled to said system bus and to said peripheral device, said peripheral device interface unit having a data storage unit to temporarily store data received from said peripheral device, monitor means for monitoring data received from said peripheral device, and having a control unit to suppress said cache write-back cycles when said monitor means determines that said peripheral device has sent and said data storage unit has stored a full line of data received from said peripheral device.

25. The computer system as recited in claim 24 further comprising: a system memory coupled to said system bus;

wherein said processor includes a means for polling said peripheral device to determine a status of said peripheral device; and wherein said peripheral interface unit control unit includes a means for transmitting data to said system memory and further includes a means for blocking a polling of said peripheral device by said processor when said peripheral interface data storage unit is receiving data from said peripheral device and until completion of transmission of said data to said system memory to prevent said processor from accessing data in said system memory corresponding to said transmitted data.

26. The computer system as recited in claim 24 wherein said peripheral device further includes a means for sending

18 an interrupt following data transfer, and said peripheral interface unit further includes an interrupt storage circuit to store said interrupt, wherein said peripheral interface unit control unit prevents said peripheral device from writing said peripheral device interrupt to said processor and writes said stored interrupt to said processor following transfer from said peripheral interface unit data storage unit to said system memory of temporarily stored data received from said peripheral device.

27. The computer system as recited in claim 24 wherein a full line of data comprises four words of data, and said means for monitoring is a line monitor unit that counts a number of data words received from said peripheral device.

28. The computer system as recited in claim 24 wherein said cache assembly includes a means for detecting, on said system bus, data corresponding to data stored in said cache assembly, and wherein said control unit comprises:

a first state-machine to control data storage in said data storage unit, to control said monitor means, and to request second state-machine service; and a second state-machine to request system bus control, to permit said suppressing of said cache write-back cycles, to permit said cache write-back cycles whenever data stored in said cache assembly is dirty and said peripheral interface unit data storage unit received less than a full line of data from said peripheral device, and for permitting said data storage unit to write data to said system bus.

29. The computer system as recited in claim 24 wherein said data includes addressing signals.

30. A method comprising the steps of:

storing data in a cache, wherein said cache is coupled to a system bus and a processor;

writing data from a peripheral device to a peripheral interface unit;

storing said data from said peripheral device in a data storage unit of said peripheral interface unit;

determining whether data written from said peripheral device to said peripheral interface unit comprises a full line of data;

suppressing a cache write-back cycle to system memory if said data written from said peripheral device comprises a full line of data; and writing data stored in said data storage unit to said system memory.

31. The method as recited in claim 30 further comprising the step of:

determining whether any data stored in said cache corresponds to any portion of said data in said data storage unit; and invalidating data stored in said cache that corresponds to any portion of said data in said data storage unit if said data written from said peripheral device comprises a full line of data.

32. The method as recited in claim 30 further comprising the step of:

determining whether data stored in said cache corresponds to any portion of said data in said data storage unit;

determining whether any corresponding data stored in said cache is dirty; and allowing a cache write-back cycle from said cache to said system memory prior to said step of writing data stored in said data storage unit to said system memory if data stored in said cache corresponds to any portion of said data in said data storage unit and said corresponding data stored in said cache is dirty.

33. The method as recited in claim 30 wherein the determining step comprises:

monitoring words of data written to said peripheral interface unit in said peripheral device writing step; and incrementing a counter in said peripheral interface unit for every word written in said peripheral device writing step.

34. The method as recited in claim 30 further comprising the steps of:

blocking a selected communication between said system bus and said peripheral device after said peripheral device writing step begins and until completion of said step of writing data stored in said data storage unit to said system memory.

35. The method as recited in claim 34 further comprising the step of:

polling said peripheral device with a polling signal;

wherein said selected communication is said polling signal.

36. The method as recited in claim 34 further comprising the steps of:

providing an interrupt from said peripheral device to said peripheral interface unit after completion of said peripheral device writing step;

storing said interrupt in a peripheral interface unit storage device; and writing said interrupt to said system bus after completion of said step of writing data stored in said data storage unit to said system memory;

wherein said selected communication is said interrupt provided from said peripheral device.

37. The method as recited in claim 34 further comprising the steps of:

determining whether additional data for writing to said peripheral interface unit from said peripheral device remains in said peripheral device following said step of writing data stored in said data storage unit to said system memory;

repeating said peripheral device storing step, said determining step, said suppressing step, and said step of writing data stored in said data storage unit to system memory if additional data for writing to said peripheral interface unit from said peripheral device remains; and unblocking said selected communication if no additional data for writing to said peripheral interface unit from said peripheral device remains.

38. The method as recited in claim 30 wherein said data in said peripheral device writing step is a line of data.

* * * * *

UNITED STATES PATENT AND TRADEMARK OFFICE
CERTIFICATE OF CORRECTION

PATENT NO. : 5,761,725
DATED : June 2, 1998
INVENTOR(S) : Charles P. Zeller, et al It is certified that error appears in the above-identified patent and that said Letters Patent is hereby corrected as shown below:

Col. 14, line 43, Claim 2; delete "claims" and insert --claim--

Signed and Sealed this

Thirteenth Day of July, 1999

Attest:

Q. TODD DICKINSON

*Attesting Officer*    *Acting Commissioner of Patents and Trademarks*